United States Patent [19]

Yamamoto et al.

[11] Patent Number: 4,982,398

[45] Date of Patent: Jan. 1, 1991

[54] OPTICAL RECORDING APPARATUS FOR FORMING GROOVES AND PITS IN AN OPTICALLY RECORDABLE DISC

[75] Inventors: Masanobu Yamamoto, Kanagawa; Sohmei Endoh, Tokyo, both of Japan

[73] Assignee: Sony Corporation, Tokyo, Japan

[21] Appl. No.: 225,917

[22] Filed: Jul. 29, 1988

[30] Foreign Application Priority Data

Jul. 31, 1987 [JP] Japan .................... 62-192229

[51] Int. Cl.$^5$ .............................................. G11B 7/00
[52] U.S. Cl. ................................. 369/119; 369/44.13
[58] Field of Search .............. 369/44, 45, 46, 100, 369/109, 111, 116, 119, 124, 275, 44.13

[56] References Cited

U.S. PATENT DOCUMENTS 4,716,560 12/1987 Itonaga ........................ 369/275

FOREIGN PATENT DOCUMENTS 61-214246 9/1986 Japan ......................... 369/109
62-78740 4/1987 Japan ......................... 369/109

Primary Examiner—Donald McElheny, Jr.
Attorney, Agent, or Firm—Hill, Van Santen, Steadman & Simpson

[57] ABSTRACT

There are provided an optical disc and an optical recording apparatus to form a tracking groove onto an optically recordable disc. This apparatus comprises: a recording beam generator to generate a recording beam such as a laser beam having a predetermined spot size so as to form a pattern of a predetermined width onto the disc; a light deflector arranged on an optical path of the recording beam generator; and a driver for driving the light deflector for reciprocally moving the recording beam in a radial direction of the disc at a high frequency, and for multi-exposing the disc by the recording beam due to the movement of the recording beam in the radial direction, whereby a groove having a width wider than the pattern of the predetermined width is formed. With this apparatus, both the discrete information pattern and a groove are formed by using a single recording beam. Namely, both the pits and a wide groove can be formed by using a single recording spot.

6 Claims, 2 Drawing Sheets

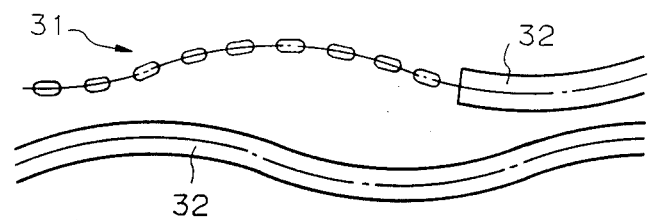
Fig. 1
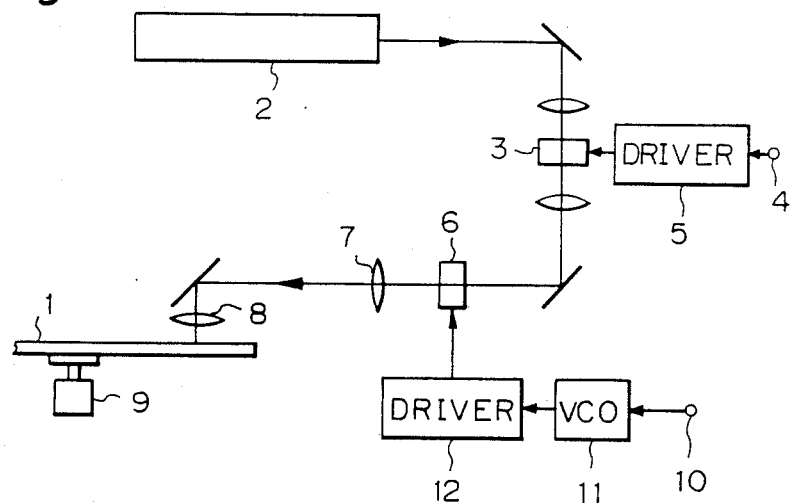
Fig. 2
Fig. 3A
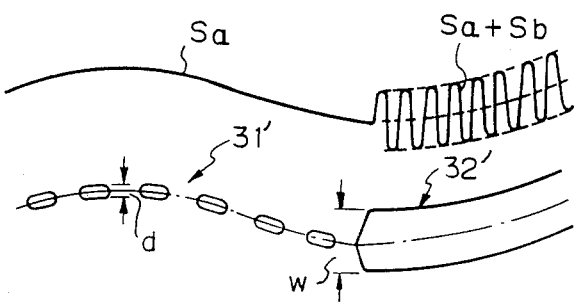
Fig. 3B
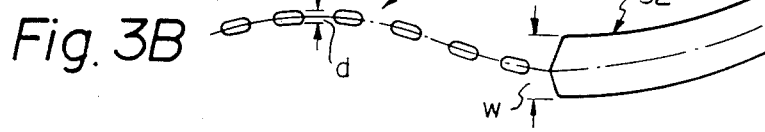

OPTICAL RECORDING APPARATUS FOR FORMING GROOVES AND PITS IN AN OPTICALLY RECORDABLE DISC

BACKGROUND OF THE INVENTION

1. Field of the Invention

The present invention relates to an optical recording apparatus to form a preformat onto an optical disc.

2. Description of the Background

It is proposed to provide an optical disc on which the Table of Contents (TOC) information, a pulse signal of a predetermined period, and the like are prerecorded as pits or bumps on the lead-in track or lead-out track as well as a wide groove, for recording data signal therein provided. FIG. 1, shows the region in which pits 31 are preformed and a wide groove 32 mixedly exist on a recordable optical disc. Hitherto, in the case of forming patterns of different widths onto a mother disc, the pits 31, groove 32, and recording spots corresponding to their widths are prepared and both of these recording spots are switched.

In the case of independently forming pits 31 and grooves 32 having different widths by a different recording spots, the following problems occur.

First, in the case of changing the spot sizes by changing the effective numerical aperture (NA) by using the same lens, the ratio of the sizes of the spots cannot be set to a large value. For example, both having a spot of the width of 0.5 [μm] and the groove of the width of 1.1 [μm] cannot be formed.

Second, since it is necessary to form two beams, the laser power must to be set to a large value.

Third, in the case of the spot of a large diameter, if its shape is not well shaped, a groove would not be formed with sharp cross sectional configuration.

Fourth, the groove width is easily changed due the exposure level and developing condition.

SUMMARY AND OBJECT OF THE INVENTION

It is, therefore, an object of the present invention to provide an optical recording apparatus in which both the pits and a wide groove can be formed by using only one recording spot and the foregoing drawbacks are eliminated.

According to the present invention, this object is accomplished with an optical recording apparatus so as to form a tracking groove onto an optically recordable disc, comprising: recording beam generating means for generating a recording beam having a predetermined spot size so as to form a pattern of a predetermined width onto the disc; light deflecting means arranged on an optical path of the recording beam generating means; and drive means for driving the light deflecting means, for reciprocatingly moving the recording beam in a radial direction of the disc at a high frequency, and for multiply exposing the disc with the recording beam due to the movement of the recording beam in the radial direction, so that a groove having a width wider than the pattern of the predetermined width is formed.

The recording beam having a spot size so as to record a discrete information pattern, i.e., pits is generated. The pits are formed by this recording beam. The central locus of the pits is wobbled. On the other hand, since the recording beam is swung in the radial direction of the disc, a wide groove is formed. In this case, since the recording beam is swung by the signal having a high frequency, a multiexposure is performed. The central locus of the wide groove formed in this manner is wobbled. Both of the pits and the wide groove are formed by using the single recording beam as explained above. Thus, the foregoing problem which on occurs when two beams are switched and used can be avoided.

The above and other objects and features of the present invention will become apparent from the following detailed description and the appended claims with reference to the accompanying drawings.

BRIEF DESCRIPTION OF THE DRAWINGS

FIG. 1 a schematic diagram showing a signal pattern on a disc to which the present invention can be applied;

FIG. 2 is a block diagram of an embodiment of the present invention;

FIGS. 3A and 3B are schematic diagrams for use in the explanation of the operation of the embodiment of the invention;

DESCRIPTION OF THE PREFERRED EMBODIMENTS

Figure 4:
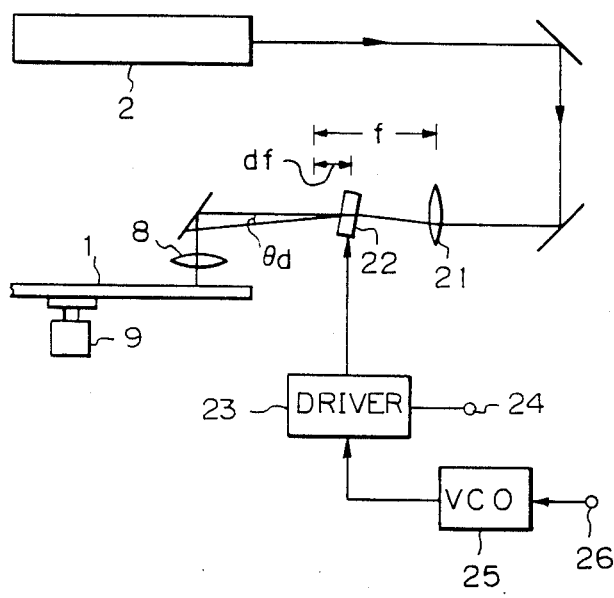
FIG. 4 is a block diagram of another embodiment of the invention.

An embodiment of the present invention will be described hereinbelow with reference to the drawings. In FIG. 2, reference numeral 1 denotes an optically recordable disc (mother disc). For example, a photo resist is coated on the disc 1 so as to have a uniform thickness. Reference numeral 2 denotes a laser, for instance, an argon ion laser. A recording beam from the laser 2 is led to a light modulator 3 using the acoustic optical effect.

When an ultrasonic wave is generated in an ultrasonic medium such as zinc molybdate ($PbMoO_4$), tellurium dioxide ($TeO_2$), or the like, a periodic change in the refractive index occurs and a diffraction grating of the phase type is produced. If a laser beam is input into this portion, the intensity and direction of the laser beam changes depending on the intensity and frequency of the ultrasonic wave. The mutual effect of the ultrasonic wave and light produces a acoustic optical effect. A light deflector, which will be explained hereinafter, also uses this acoustic optical effect.

A signal from an input terminal 4 is supplied to the light modulator 3 through a driver 5. In the case of forming pits, the signal input in the terminal 4 is the EFM (8–14 modulation) signal (pulse signal). The recording beam is turned on/off by the EFM signal. In the case of forming a groove, the signal input in the terminal 4 is a DC signal of a predetermined level. The recording beam is turned on by the DC signal.

The recording beam output from the light modulator 3 is supplied to a light deflector 6 using the acoustic optical effect. The foregoing light modulator 3 changes the intensity of the diffracted light with the frequency of the ultrasonic wave held constant. On the other hand, the light deflector 6 changes the frequency of the ultrasonic wave with the intensity of the diffracted light held constant, thereby causing the deflection.

The recording beam output from the light deflector 6 is irradiated onto the disc 1 through an intermediate lens 7 and an objective lens 8. The disc 1 is rotated by a spindle motor 9 at the constant linear velocity (CLV).

A high frequency signal formed by a voltage controlled oscillator (VCO) 11 is supplied to the light deflector 6 through a driver 12. The frequency of the high frequency signal is changed so as to wobble the recording beam with the light deflector 6. A control signal is supplied from a terminal 10 to the VCO 11.

As illustrated in FIG. 3A, when pits are formed, a control signal $S_a$ having the frequency of $f_w = 22.05$ [kHz], is supplied to the terminal 10. The frequency of the high frequency signal which is generated from the VCO changes by the frequency $f_w$, so that the recording beam is swung by the frequency $f_w$. A sync signal, an address signal, and the like are recorded by frequency modulating or phase modulating the control signal $S_a$. On the other hand, in the case of forming a wide groove, as shown in FIG. 3A, a signal $S_b$ having a sufficiently high frequency $f_0$ is supplied as a control signal together with, the signal $S_a$ to the VCO 11. Assuming that a spot size of a predetermined width to be recorded by the recording beam is d and that the linear velocity during recording is v, the frequency $f_0$ is selected to be $$f_0 > v/d$$

For example, assuming that (d=0.5 μm, v=1.25 m/sec), the frequency $f_0$ is set to ($f_0 > 2.5$ MHz, e.g. 5 MHZ).

As shown in FIG. 3B, in the case of forming pits, the recording spot is wobbled by the frequency ($f_w = 22.05$ kHz) and a pit portion 31' consisting of the same pit width as the recording spot size is obtained which corresponds to the EFM signal which is supplied to the light modulator 3. On the other hand, in the groove portion, the recording spot produces a locus in the width direction and multi-exposes the portion in the area, so that a wide groove portion 32' is obtained. Therefore, after the photo resist is developed, the pits corresponding to the pit portion 31' and the wide groove corresponding to the wide groove portion 32' wobbled by the frequency $f_w$ is obtained. The width w of the groove can be changed within a range of (d≦w≦q) (q: track pitch) by the amplitude of the signal $S_b$.

On the other hand, it is also possible to make the linear velocity during recording as slow as necessary, thereby allowing a fine multi-exposure to be executed.

Further, the signal of the frequency $f_w$ is not limited to a sine wave signal but may be a clock signal or a signal which is frequency modulated by the absolute time information of the CD.

FIG. 4 shows another embodiment of the present invention. In this another embodiment, the modulation and deflection are performed by a single device (called a light modulation deflector) which is different from the foregoing embodiment in which the different light modulator 3 and light deflector 6 are independently used.

As shown in FIG. 4, the recording beam from the laser 2 is input to a light modulation deflector 22 through an intermediate lens 21. The light modulation deflector 22 uses the acoustic optical effect. The intermediate lens 21 is provided to focus the spot size. The position of the focal distance F of the intermediate lens 21 and the center of the light modulation deflector 22 are spaced away from each other by only a distance of $d_f$. Even if the light modulation deflector 22 performs the deflection on the focal point of the intermediate lens 21, the wobbling is not executed on the disc 1. As the distance $d_f$ is set to a large value, the amount of wobbling on the disc increases. However, since the spot size increases, it is difficult to deflect the beam at a high speed or to modulate it at a high speed. Therefore, df is determined in accordance with the necessary amount of wobbling amount. In FIG. 4, $\theta_d$ denotes a deflecting angle.

A high frequency signal from a driver 23 is supplied to the light modulation deflector 22. An EFM signal (pulse signal) is supplied from a terminal 24 to the driver 23. An output signal of the driver 23 is turned on/off in accordance with the logic levels of "0" and "1" of the EFM signal. When a groove is formed, the signal of the "1" level of the EFM signal from the terminal 24 is supplied. When the EFM signal is set to the "0" level, the output signal of the driver 23 is turned off and the recording beam is not irradiated onto the disc 1. Thus, the pit corresponding to the EFM signal supplied from the terminal 24 is formed on the disc 1.

Figure 5A:
FIGS. 5A and 5B are schematic diagrams for use in explanation of the operation of another embodiment of the invention.
Figure 5B:
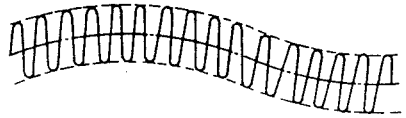

The high frequency signal from a VCO 25 is supplied to the driver 23. A control signal from a terminal 26 is supplied to the VCO 25. When the pits are formed, this control signal is the signal having the frequency of 22.05 kHz as shown in FIG. 5A. When a groove is formed, this control signal is the multiplexed signal of the signal of 22.05 kHz and the signal of 5 MHz as shown in FIG. 5B.

The VCO 25 has a center frequency of, e.g., 224 MHz. A frequency of an output signal of the VCO 25 changes in accordance with a signal from the terminal 26. The output signal of the VCO 25 is supplied to the light modulation deflector 22 through the driver 23, so that the wobbling is performed and the wide groove is formed.

According to the present invention, in the case where both pits and a wide groove are formed on a disc (mother disc), both of them can be formed by using a single recording beam. Therefore, different from the apparatus which independently uses different recording beams, the following advantages are obtained.

First, the width is electrically controlled and a groove of a desired width can be easily formed.

Second, since only one recording beam is used, a construction and the adjustment of the optical system are simplified.

Third, since a groove is formed by fine spots, the groove whose edge has a sharp cross section is derived.

On the other hand, according to another embodiment of the present invention, since the light modulation and light deflection are performed by using a single device, the following advantages are further obtained in addition to the foregoing advantages.

First, a distortion of the spot shape of the recording beam can be reduced.

Second, there is no need to obtain the synchronization of the light deflector and light modulator and the alignment of the optical system is simplified.

Third, the loss of laser power is small.

Fourth, as compared with the method whereby a parallel beam is input to the light deflector, a wide deflecting band is obtained.

The present invention is not limited to the foregoing embodiments but many modifications and variations are possible within the spirit and scope of the appended claims of the invention.

What is claimed is:

1. An optical recording apparatus to form a tracking groove onto an optically recordable disc, comprising:
   recording beam generating means for generating a recording beam having a predetermined spot size such as to form a pattern of a predetermined width onto the disc;

light deflecting means arranged on an optical path of said recording beam generating means; and drive means for driving said light deflecting means, for reciprocatingly moving the recording beam in a radial direction of the disc at a high frequency, and for multiple exposing the disc by the recording beam due to the movement of the recording beam in said radial direction, thereby a groove having a width wider than the pattern of said predetermined width is formed.

2. An apparatus according to claim 1, further comprising light modulating means arranged on said optical path, and thereby a discrete information pattern of said predetermined width is also formed.

3. An apparatus according to claim 1, wherein said high frequency $f_0$ is given by the following equation, $$f_0 > v/d$$

where, v is a relative velocity between the recording beam and the disc due to a rotation of the disc and d indicates a spot size of the recording beam.

4. An apparatus according to claim 2, wherein said drive means drives said light deflecting means so as to reciprocatingly move the recording beam in the radial direction of the disc at the high frequency, multiple exposes the disc by the recording disc due to the movement of the recording beam in the radial direction, reciprocatingly moves the recording beam in the radial direction of the disc at a low frequency, and wobbles said tracking groove having the width wider than the pattern of said predetermined width and said discrete information pattern.

5. An apparatus according to claim 2, wherein said light deflecting means and said light modulating means are constructed by one acoustic optical means.

6. An apparatus according to claim 5, further having a lens for converging the beam which enters said acoustic optical means.

* * * * *